United States Patent Office 2,966,164
Patented Dec. 27, 1960

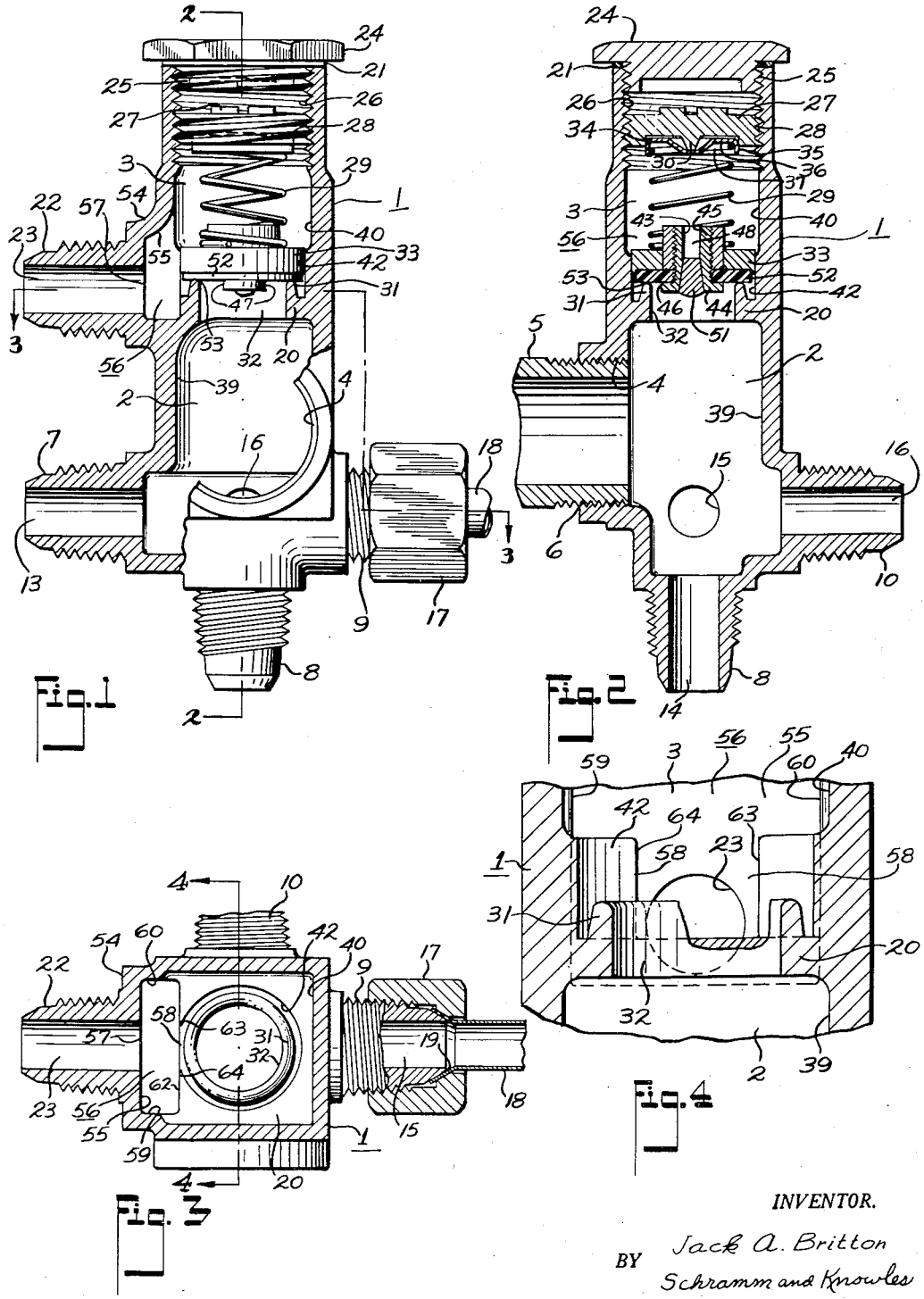

2,966,164

FLUID TEMPERATURE-PRESSURE RELIEF VALVE

Jack A. Britton, 11720 Edgewater Drive,
Lakewood 7, Ohio

Filed Sept. 22, 1955, Ser. No. 535,861

14 Claims. (Cl. 137—73)

This invention relates to combined temperature and pressure fluid relief valves and more specifically to an improved valve which is of reduced size, reduced cost of manufacture, and which has improved operating characteristics.

One type of temperature-pressure relief valve employs a cylindrically shaped spring biased valve body peripherally guided by a cylindrically shaped surface in the interior of a housing. In such a valve the housing defines an internal chamber which is divided into exhaust and pressure portions by a circular valve seat. The valve biasing spring is adjustable to hold the valve body against the seat to resist pressures below the particular predetermined limit for which the spring is set. A passage connects the pressure chamber portion to the exhaust chamber portion. This passage is plugged by a low fusion metal or other suitable heat responsive material so that when predetermined temperature limits are exceeded the plug is released opening the passage between the chamber portions. Thus the exhaust chamber portion receives fluid released from the pressure chamber portion through either the circular seat of the pressure control system or the passage of the temperature control system. To insure proper discharge of received fluid from the exhaust chamber portion it is necessary to provide unobstructed passages of adequate cross section leading out of the exhaust chamber from both the circular valve seat and the temperature passage. One of the principal objectives of the present invention is to obtain free flow and release of fluid received in the exhaust chamber even though the relief device is relatively small and compact, particularly with respect to its length along the axis of the valve body. As a more specialized objective concerned with this aspect of the invention it is sought further to shorten the overall length of the valve and the extent of longitudinal valve body movement required for effective relief by providing a lateral relief chamber in the wall of the housing. The relief chamber is employed to provide a direct fluid escape passage of substantial circumferential extent about the annual relief opening and at the same time to permit the exhaust passage to be located in and on either side of (both above and below) the plane of the valve seat to further shorten the overall length dimension of the valve assembly.

Another object of this invention is to provide direct communication between a fluid exhaust passage which opens into the exhaust chamber and a substantial portion of the annular fluid release opening defined by the valve body and the valve seat to reduce the extent, longitudinal to the housing, of valve body movement required to place the valve in a fully opened condition and obtain full capacity relief flow of fluid out of the pressure chamber in response to excessive pressure conditions.

In some applications of valves of this type such as in house trailers, space and weight are critical factors and it is therefore an additional object of the invention to provide a multiple purpose device which incorporates in a body comprising a one piece housing in the form of a casting of brass, bronze or the like not only pressure and temperature relief features but also plural connectors for attaching the tubes or pipes of a distribution system so that, in effect, the relief device serves also as a distribution manifold.

Fluid conduction systems, such as hot water systems, have heretofore used pressure-temperature relief devices having single inlet and single outlet openings in connection with conventional T's, Y's and the like to disperse the fluid to various use outlets. The multiple purpose device of this invention reduces the cost of installing such a system and the space required to install such a system.

As an additional object of the invention the quantity of material required to form a temperature-pressure relief valve is reduced with attendant savings in weight and manufacturing cost due to the previously described shortening of the length of the valve.

Further objects and advantages are apparent in the following detailed description of a preferred embodiment of the invention representing the best known mode of practicing its principles and from the appended drawings which are part of the specification.

In the drawings:

Fig. 1 is a side elevational view, partly in vertical section and with parts removed, of a combination distribution manifold and relief valve assembly embodying the present invention and showing the valve body in yieldable engagement with the valve seat, the spring adjustment, and a use conduit affixed to an outlet;

Fig. 2 is a vertical cross-sectional view of the valve in the plane indicated by the line 2—2 of Fig. 1 showing the entire valve assembly and a supply conduit screwed into the inlet opening;

Fig. 3 is a sectional view with parts broken away taken along line 3—3 of Fig. 1; and, Fig. 4 is a fragmentary sectional view on an enlarged scale taken along line 4—4 of Fig. 3 showing a portion of the valve seat broken away to reveal the lateral opening into the relief.

The temperature-pressure relief valve of this invention has a cast brass housing 1 having an inner surface which defines an internal chamber divided by a transverse integral partition 20 into lower pressure chamber portion 2 and upper exhaust chamber portion 3. The pressure chamber portion has an internally threaded supply opening 4 to which a suitable fluid supply conduit 5 may be affixed by threaded engagement shown at 6. To form a fluid dispersing system which is combined with and an integral part of the pressure relief valve, a plurality of integral nipples 7, 8, 9, and 10 are provided on the housing and outlet openings 13, 14, 15 and 16 respectively are drilled or otherwise suitably formed in the nipples. Each of the outlet nipples 7, 8, 9 and 10 is externally threaded to receive a use conduit tube or pipe in an appropriate connection such as the connection disclosed in Figs. 1 and 3 where a nut or collar 17 is threaded onto the nipple 9 to affix conduit tube 18 and to cause a fluid-tight seal to be formed by flared tube end 19 and the external frusto-conical surface of the nipple end.

An integral exhaust nipple 22 which is drilled to define an exhaust opening 23 is provided in the wall of the housing and is connected to the exhaust chamber portion 3 through passages which will subsequently be defined in more detail. The exhaust nipple 22 is externally threaded in the same manner as outlet nipples 7, 8, 9 and 10 to permit an appropriate exhaust conduit or tube (not shown) to be connected to the exhaust opening.

A flanged cap 24 having a noncircular hex top and downwardly extending externally threaded portion 25 is inserted in threaded engagement with internal threads 26 which are formed inside a top opening of the housing which is continuous with the top of the exhaust chamber portion 3. The cap 24 forms a fluid seal for the exhaust chamber portion through coaction with washer 21 disposed between the cap flange and the upper end of the housing. A valve adjusting screw plug 27 having external threads 28 is placed in threaded engagement with the threaded section 26 of the housing, inwardly of the cap 24.

A valve seat 31 is formed in the central integral web or partition 20 which divides the housing interior into the upper exhaust and lower pressure portions mentioned. The valve seat defines a circular opening 32 which connects the housing chamber pressure and exhaust portions 2 and 3. A valve body indicated generally at 33 is held in yieldable sealing engagement against the valve seat 31, by a helical coil compression spring 29 reacting against the screw plug 27.

The valve adjusting screw plug has an annular relief area 34 on its under side which receives a circular spring receiving disc or seat member 35. The spring receiving member 35 is a shallow cup shaped brass stamping and on its under side is formed to define an annular relief 36 which receives and locates upper end 37 of the spring 29. The spring adjusting screw 27 has a frusto-conical pin extension 30 directed downwardly in the center of annular relief area 34 to provide point contact bearing in depressed center 38 of the disc 35, there being an annular clearance surrounding the pin 30 between the screw plug 27 and the spring receiving cup 35. The point contact so formed transmits axial biasing pressure between the spring 29 and the spring adjustment screw 27 to reduce friction upon rotation of the plug 27 relative to the spring and spring receiving member 35. The point contact permits the valve body to be guided into complete and accurate engagement with the valve seat and prevents internal stress or binding conditions which might otherwise exist.

The housing 1 is of generally square section and inner surfaces 39, 40 define, respectively, the extent of the generally square sectioned pressure and exhaust chamber portions 2 and 3. A cylindrical wall surface section 42 at the lower end of the exhaust chamber 3 and of slightly less cross sectional area than the upper part of the latter engages the periphery of the valve body 33 to center and direct or guide the body into appropriate engagement with the valve seat 31. The cylindrical guide surface 42 may be formed simultaneously with the valve seat 31 and the passage 32 by a special rotary tool introduced axially through the top end opening of the housing.

The valve body 33 has an internally threaded axial passage 43 which receives the threaded reduced diameter section 45 of a plug member 44. Flanged end portion 46 of the plug has a pair of relieved areas or flats 47 to provide surfaces to receive a wrench or the like to tighten the threaded engagement of the plug and the valve body.

The plug 44 has an axial passage 48 which is closed by a quantity of fusible material 51 such as a metal alloy having a melting point which will result in the material 51 melting and flowing or being forced out of the passage when fluid in the pressure chamber and the metal plug 44 exceed a predetermined temperature limit. A temperature sensitive escape or connecting passage is thus provided between the pressure and exhaust chamber portions through the passage 48.

An annular flat faced washer 52 of rubber, polyethylene or other suitable plastic material is affixed to and forms a part of the valve body as by being clamped between the flat end face of the valve body 33 and the flange of the plug 44. This washer is positioned to engage the valve seat 31 in the provision of a fluid-tight seal. The annular washer 52 and the valve seat 31 have complemental surfaces which have circular engagement at 53 to provide such fluid-tight seal.

The housing 1 has an enlarged part 54 in that section of the wall which carries the exhaust nipple or spigot 22. The enlarged part 54 has an inner surface 55 which defines a side recess relief chamber or alcove 56 laterally of and continuous with the exhaust chamber 3 and also continuous with the exhaust opening 23. The relief chamber 56 is to one side of the valve seat and the valve body and is defined in part by a segment of the cylindrical periphery of the valve body. Preferably the relief chamber 56, the exhaust passage 23 and the opening or connection therebetween indicated at 57 all lie on both sides of i.e., both above and below, the plane of the valve seat 31, which plane is the plane of the complemental surface circular line engagement 53.

When pressure exerted by fluid in the pressure chamber portion 2 exceeds a predetermined limit and the valve body 33 is unseated in response to such pressure, an annular opening is formed between the complemental surfaces of the valve seat and body. The opening so formed is connected directly to the relief chamber 56 and to the exhaust passage 23 through an opening 58 in the cylindrical wall surface 42 to provide exhaust fluid flow in a substantially wholly radial or lateral pattern from the valve seat 31.

The provision of the lateral escape opening 58 which is at the periphery of and has a substantial extent circumferentially of the valve body, whether the valve body is unseated completely or only so slightly as to provide a hairline opening, obtains a valve arrangement in which longitudinal movement of the valve body for full capacity relief flow is substantially reduced. Such a construction also provides positive immediate pressure relief upon unseating of the valve body. Upon unseating of the valve body 33 there is obtained direct unobstructed flow of fluid from the pressure chamber through the axial opening 32, laterally across the valve seat, through the opening 58 at the periphery of the valve body, and into the relief chamber. The effective area of the U-shaped opening 58 has its extent axially or longitudinally of the housing defined, when the valve body is unseated, by the spaced parallel planes of the valve seat and the valve body. The opening 58 has rather irregular vertical side edges which define its extent circumferentially of the guide wall 42.

In making the relief device of the present invention, the body 1 is cast of brass or similar metal, the pressure and exhaust chambers being cored. A core is formed which has an external configuration which substantially conforms to the desired finished configuration of the inner surfaces 39 and 40 of the housing. The core includes a portion which extends or protrudes laterally from the overall generally symmetrical transverse configuration of the exhaust chamber and is shaped to form the relief chamber 56. A mold is formed having a surface which conforms to the desired finished external surface of the housing 1. The mold surface preferably has a relieved area to form the enlarged part 54 which contains the internal relief chamber 56. The housing, including the various nipples and the central integral web 30, is then cast about the core and in the mold. Alternately, the housing may be forged, machined from a solid piece of metal, or formed in any other suitable manner, the casting technique being preferred from an economic standpoint.

When the rotary tool mentioned above is inserted to form the valve seat 31, guide surface 42 and the axial passage 32, the tool cuts through wall 62 of the relief chamber in the formation of the lateral relief opening 58. Side edges 63, 64 of this opening are thus defined by the intersections of the cylinder generated by the valve guide surface 42 and the inside wall 62 of the relief chamber.

The effective area of the lateral relief passage available upon the unseating of the valve body is defined by the extent of the valve body movement and the space between side edges 63 and 64 of the relief opening 58. Such passage preferably has a cross-sectional area, when the valve is opened, sufficient to accommodate full flow from the pressure chamber 2 without objectionable back pressure at the operating pressures for which the device is adjusted. The extent or dimension of the relief opening 58 transverse to the housing is as great or greater than its extent longitudinal to the housing.

The nipples 7, 8, 9, 10, and 22 are drilled to provide the discharge passages 13, 14, 15 and 16, and the exhaust passage 23 respectively. Drilling of such openings is preferred to provide smooth uniform fluid passages. Thread cutting operations are performed to provide external threads on the nipples 7, 8, 9, 10 and 22, the internal threads 26 in the top opening of the exhaust chamber portion 3, and the internal threads in the supply opening 4.

The present invention thus provides an improved temperature-pressure relief device having in combination a fluid dispersing manifold system, a shortened overall axial length and reduced weight, with attendant savings in the cost of manufacture. Improved positive valve action is obtained which acts over a comparatively short range of unseating movement. An improved unobstructed pressure relief passage is provided through the use of lateral relief chamber.

In accordance with the patent statutes the principles of the present invention may be utilized in various ways, numerous modifications and alterations being contemplated, substitution of parts and changes in construction being resorted to as desired, it being understood that the embodiment shown in the drawings and described above and the particular method set forth are given merely for purposes of explanation and illustration without intending to limit the scope of the claims to the specific details disclosed.

What I claim and desire to secure by Letters Patent of the United States is:

1. A fluid relief device comprising a housing defining an internal chamber, said housing having an internal partition formed with an aperture and a circular valve seat dividing the chamber into upper exhaust and lower pressure portions, a circular valve body disposed in the lower part of the upper exhaust chamber portion, a spring interposed between the housing and the valve body to hold the latter yieldingly against the seat, the housing being formed with a cylindrically curved internal guide wall concentric to the valve seat for engaging the periphery of the valve body to center the latter over the valve seat, said device having a passage connecting the lower pressure chamber portion to that part of the upper exhaust chamber portion disposed above the valve body, temperature responsive means normally sealing said connecting passage and arranged to open such passage when the device exceeds a predetermined temperature to permit the escape of fluid from the pressure chamber portion into the exhaust chamber portion, said housing being formed with an internal relief chamber to one side of and extending both above and below the plane of the valve seat, the cylindrically curved valve guiding wall being discontinuous in the region of the lateral relief chamber thereby providing an opening to permit direct flow of fluid through the valve seat opening and laterally into the relief chamber upon unseating of the valve body, the relief chamber having a width greater than the valve seat diameter and being in direct communication across its full width with said part of the exhaust chamber portion above the valve body for direct flow into the relief chamber of fluid introduced into the exhaust chamber through the connecting passage, whereby the relief chamber is adapted to receive fluid directly from the valve seat opening when the valve body is raised off the valve seat by excessive pressure in the pressure chamber and also to receive fluid directly from the exhaust chamber portion when the temperature responsive means opens the connecting passage, the housing having an inlet communicating with the pressure portion, means for attaching a supply to such opening, and said housing having an exhaust opening communicating with and of less cross sectional area than the relief chamber.

2. A fluid pressure-temperature relief device comprising a housing having an inner surface defining a fluid chamber having longitudinally spaced ends, the housing having an internal partition formed with an aperture and a valve seat, said partition being formed intermediate the ends of the chamber to divide the chamber into pressure and exhaust portions, a cylindrically surfaced valve body disposed within the exhaust chamber portion to yieldably engage the valve seat, a spring to bias the valve body against the valve seat, said inner surface having a cylindrically-shaped section to slidably engage the cylindrical surface of the valve body circumferentially to direct the body into engagement with the valve seat, said housing having an enlarged part adjacent the valve seat, the enlarged part having a relief chamber therein, the relief chamber opening into the exhaust chamber portion in the housing through said inner surface including a segmental cutout in the cylindrically shaped section, the housing having a circular sectioned exhaust passage opening into the relief chamber, the exhaust passage being connected to the exhaust chamber portion by said relief chamber at a section of the exhaust chamber portion separated from the valve seat by the valve body, the relief chamber upon unseating of the valve body being connected directly to the pressure chamber portion through the cutout opening in the cylindrically shaped section, said segmental cutout having an extent transverse to the housing greater than the diameter of the exhaust opening said housing having inlet and outlet openings communicating with said pressure chamber portion whereby fluid under pressure may pass through the pressure chamber portion and fluid under pressure exceeding a predetermined limit will cause the valve body to shift longitudinally against the spring to unseat itself to connect the pressure chamber portion to the exhaust passage to permit fluid to escape to reduce such excess pressure, and temperature responsive means to connect said separated portion of the exhaust chamber portion to the pressure chamber portion when the temperature of fluid in the pressure chamber portion exceeds a predetermined temperature limit.

3. A fluid pressure relief device comprising a hollow housing having walls defining an internal chamber, a partition dividing the chamber into pressure and exhaust portions, said partition being formed with a through passage terminating in a circular valve seat at the exhaust chamber end of the passage, one wall of the housing being cylindrically curved and disposed about a generally circular sectioned part of the exhaust chamber portion adjacent the valve seat, the exhaust portion of the chamber also having another part remote from the valve seat and of larger cross sectional area than the circular sectioned part, a valve body disposed in the circular sectioned part of the exhaust chamber portion, spring means biasing the valve body into sealing engagement with the valve seat, the housing being formed with a relief chamber continuous with the said other part of the exhaust portion of the chamber, said one cylindrically curved wall of the housing being formed with an opening between the relief chamber and the circular sectioned part of the exhaust chamber portion whereby fluid released from the pressure portion of the chamber through the communicating passage upon separation of the valve body from the valve seat flows radially with respect to the axis of the through passage and the working axis of the valve body into the relief chamber, and the casing being formed with tube connecting means containing passages communicating with the pressure portion of the chamber and with the relief chamber.

4. A fluid relief device comprising a hollow housing having an internal partition dividing the housing interior into pressure and exhaust chambers, the partition being formed with a passage connecting the chambers, said passage terminating in a circular valve seat on the exhaust chamber side of the partition, the housing being formed with a cylindrically curved internal wall surface defining a generally cylindrical valve receiving portion of the exhaust chamber, said internal wall being concentric to and spaced outwardly from the valve seat, the housing being formed with a relief chamber located radially outwardly of the valve receiving portion of the exhaust chamber, the housing having a discharge passage opening into the relief chamber, the housing being formed with a lateral direct communication opening through, the cylindrically curved wall surface through which the valve receiving portion communicates directly with the relief chamber, the plane of the valve seat intersecting both the opening in the cylindrically curved wall surface and the discharge passage opening, a valve body in the exhaust chamber, means biasing the valve body to hold one end of the latter yieldingly against the valve seat, said valve body having a circular periphery slidingly engaging the cylindrically curved wall surface to guide and center the valve body with respect to the valve seat, the exhaust chamber also including a thermal escape portion located at another and remote end of the valve body opposite said one end, means defining a bypass passage connecting the pressure chamber to the thermal escape portion with the valve body sealingly engaging the valve seat, temperature sensitive means normally sealing said bypass passage and adapted to open the latter at a predetermined temperature to release fluid from the pressure chamber into the thermal escape portion, and said relief chamber being continuous with the thermal chamber portion through a lateral opening into the latter located at the remote end of the valve body in all positions to which the valve body is displaced from the valve seat in normal use, whereby upon increase in both temperature and pressure of fluid in the pressure chamber resulting in opening of the by-pass passage and displacement of the valve body from the valve seat fluid flows laterally from the passage in the partition at the one end of the valve body and directly into the relief chamber through the opening in the cylindrically curved wall surface and simultaneously from the thermal escape portion at the other end of the valve body directly into the relief chamber for discharge through the discharge passage.

5. A fluid relief device comprising a hollow housing having an internal partition dividing the housing interior into pressure and exhaust chambers, the partition being formed with a passage connecting the chambers and with an upstanding circular flange surrounding the passage opening on the exhaust chamber side of the partition, said upstanding flange having a circular edge constituting a valve seat, the housing being formed with a cylindrically curved internal wall surface defining a generally cylindrical valve receiving portion of the exhaust chamber, said internal wall being concentric to and spaced outwardly from the circular valve seat and flange, a valve body disposed in the valve receiving portion of the exhaust chamber, resilient means biasing the valve body to hold one end of the latter against the valve seat, the valve body being formed with a circular periphery slidingly engaging the cylindrically curved wall of the housing to center the valve body relative to the valve seat and guide the valve body when displaced from the valve seat by fluid under pressure in the pressure chamber, the housing being formed with a lateral relief chamber located radially outwardly of the valve receiving portion of the exhaust chamber defined by the cylindrically curved wall surface, the housing being formed with an external boss for attachment of a discharge conduit, said boss being formed with a discharge passage which opens inside the housing into the lateral relief chamber, the opening of the discharge passage being intersected by the plane of the valve seat, the housing being formed with a lateral direct communication opening through the cylindrically curved wall surface through which the valve receiving portion is in direct communication with the lateral relief chamber, such opening in the cylindrically curved wall surface being intersected by the plane of the valve seat, the exhaust chamber also including a thermal escape portion located at another and remote end of the valve body opposite said one end, means defining a by-pass passage connecting the pressure chamber to the thermal escape portion with the valve body sealingly engaging the valve seat, temperature sensitive means normally sealing said by-pass passage and adapted to open the latter at a predetermined temperature to release fluid from the pressure chamber into the thermal escape portion, and said relief chamber being continuous with the thermal escape portion through a lateral opening into the latter located at the remote end of the valve body in all positions to which the valve body is displaced from the valve seat in normal use, whereby upon increase in both temperature and pressure of fluid in the pressure chamber resulting in the opening of the by-pass passage and displacement of the valve body from the valve seat fluid flows laterally from the passage in the partition at the one end of the valve body and directly into the relief chamber through the opening in the cylindrically curved wall surface and simultaneously from the thermal escape portion at the other end of the valve body directly into the relief chamber for discharge through the discharge passage.

6. A fluid relief device comprising a hollow housing having an internal partition dividing the housing interior into pressure and exhaust chambers, the partition being formed with a passage connecting the chambers, said passage terminating in a circular valve seat on the exhaust chamber side of the partition, said exhaust chamber having a longitudinal axis normal to the plane of the valve seat and comprising a valve receiving portion adjacent the valve seat defined by a cylindrically curved internal wall surface of the housing and a remote portion spaced from the valve seat by the valve receiving portion and of greater cross sectional area than the latter transverse to said axis, said internal wall being concentric to and spaced outwardly from the valve seat, the housing being formed with a relief chamber located radially outwardly of the valve receiving portion of the exhaust chamber, the housing having a discharge passage opening into the relief chamber, the housing being formed with a lateral direct communication opening through the cylindrically curved wall surface through which the valve receiving portion communicates directly with the relief chamber, the plane of the valve seat intersecting both the opening in the cylindrically curved wall surface and the discharge passage opening, a valve body in the exhaust chamber, means in the remote portion biasing the valve body to hold one end of the latter yieldingly against the valve seat, said valve body having a circular periphery slidingly engaging the cylindrically curved wall surface and closely embraced thereby about the major portion of the periphery of the valve body to guide and center the valve body with respect to the valve seat, said relief chamber being continuous and in direct communication with the remote portion through a lateral opening into the latter located at the remote end of the valve body in all positions to which the valve body is displaced from the valve seat in normal use.

7. A fluid relief device comprising a hollow housing having an internal partition dividing the housing interior into pressure and exhaust chambers, the partition being formed with a passage connecting the chambers, said passage terminating in a circular valve seat on the exhaust chamber side of the partition, the housing being formed with a cylindrically curved internal wall surface defining a generally cylindrical valve receiving portion of the exhaust chamber, said internal wall being concentric to and spaced outwardly from the valve seat, the housing being formed with a relief chamber located radially outwardly of the valve receiving portion of the exhaust chamber, the housing having a discharge passage opening into the relief chamber, the housing being formed with a lateral direct communication opening through the cylindrically curved wall surface through which the valve receiving portion communicates directly with the relief chamber, the plane of the valve seat intersecting both the opening in the cylindrically curved wall surface and the discharge passage opening, a valve body in the exhaust chamber, means biasing the valve body to hold one end of the latter yieldingly against the valve seat, said valve body having a circular periphery slidingly engaging the cylindrically curved wall surface to guide and center the valve body with respect to the valve seat, the exhaust chamber also including a thermal escape portion located at another and remote end of the valve body opposite said one end, the valve body being formed with a by-pass passage connecting the pressure chamber to the thermal escape portion with the valve body sealingly engaging the valve seat, a fusible plug in the valve body passage normally sealing the latter and adapted to melt at a predetermined temperature to open the by-pass passage for release of fluid into the thermal escape portion from the pressure chamber, and said relief chamber being continuous with the thermal escape portion through a lateral opening into the latter located at the remote end of the valve body in all positions to which the valve body is displaced from the valve seat in normal use, whereby upon increase in both temperature and pressure of fluid in the pressure chamber resulting in opening of the by-pass passage and displacement of the valve body from the valve seat fluid flows laterally from the passage in the partition at the one end of the valve body and directly into the relief chamber through the opening in the cylindrically curved wall surface and simultaneously from the thermal escape portion at the other end of the valve body directly into the relief chamber for discharge through the discharge passage.

8. A fluid relief device comprising a hollow housing having an internal partition dividing the housing interior into pressure and exhaust chambers, the partition being formed with a passage connecting the chambers and with an upstanding circular flange surrounding the passage opening on the exhaust chamber side of the partition, said upstanding flange having a circular edge constituting a valve seat, said exhaust chamber having a longitudinal axis normal to the plane of the valve seat and comprising a valve receiving portion adjacent the valve seat defined by a cylindrically curved internal wall surface of the housing and a remote portion spaced from the valve seat by the valve receiving portion and of greater cross sectional area than the latter transverse to said axis, said internal wall being concentric to and spaced outwardly from the valve seat, the housing being formed with a lateral relief chamber located radially outwardly of the valve receiving portion of the exhaust chamber defined by the cylindrically curved wall surface, the housing being formed with an external boss for attachment of a discharge conduit, said boss being formed with a discharge passage which opens inside the housing into the lateral relief chamber, the opening of the discharge passage being intersected by the plane of the valve seat, the housing being formed with a lateral direct communication opening through the cylindrically curved wall surface through which the valve receiving portion is in direct communication with the lateral relief chamber, such opening in the cylindrically curved wall surface being intersected by the plane of the valve seat, a valve body disposed in the valve receiving portion of the exhaust chamber, resilient means biasing the valve body to hold one end of the latter against the valve seat, the valve body being formed with a circular periphery slidingly engaging the cylindrically curved wall of the housing to center the valve body relative to the valve seat and guide the valve body when displaced from the valve seat by fluid under pressure in the pressure chamber, means defining a by-pass passage connecting the pressure chamber to the remote portion with the valve body sealingly engaging the valve seat, temperature sensitive means normally sealing said by-pass passage and adapted to open the latter at a predetermined temperature to release fluid from the pressure chamber into the remote portion, and said relief chamber being continuous with the remote portion through a lateral opening into the latter located at the remote end of the valve body in all positions to which the valve body is displaced from the valve seat in normal use, whereby upon increase in both temperature and pressure of fluid in the pressure chamber resulting in opening of the by-pass passage and displacement of the valve body from the valve seat fluid flows laterally from the passage in the partition at the one end of the valve body and directly into the relief chamber through the opening in the cylindrically curved wall surface and simultaneously from the remote portion at the other end of the valve body directly into the relief chamber for discharge through the discharge passage.

9. A fluid relief device comprising a hollow housing having an internal partition dividing the housing interior into pressure and exhaust chambers, the partition being formed with a passage connecting the chambers, said passage terminating in a circular valve seat on the exhaust chamber side of the partition, said exhaust chamber having a longitudinal axis normal to the plane of the valve seat and comprising a valve receiving portion adjacent the valve seat and a remote portion spaced from the seat by the receiving portion, the housing being formed with a lateral relief chamber located radially outwardly of the receiving portion, a valve body disposed in the receiving portion, resilient means biasing the body and forcing one of its ends sealingly against the seat, the valve receiving portion being formed with an internal wall constituting a guide for the valve body centering the latter on the seat, said guide wall being interrupted by an opening at and into the relief chamber to permit lateral fluid flow into the latter directly from between the seat and the body when the biasing force of the resilient means is overcome and the body separated from the seat, the housing being formed with an external boss for attachment of a discharge conduit, said boss being formed with a discharge passage which has an opening inside the housing into the relief chamber, the opening of the discharge passage being intersected by the plane of the valve seat, means defining a by-pass passage connecting the pressure chamber to the remote portion of the exhaust chamber with the body so engaging the seat, temperature sensitive means normally sealing the by-pass passage and adapted to open the latter at a predetermined temperature to release fluid from the pressure chamber into the remote portion with the body so engaging the seat, the relief chamber being continuous with the remote portion with the body so engaging the seat and being connected to the exhaust chamber through an opening having a width parallel to the plane of the seat greater than the diameter of the seat and having a height normal to such plane greater than the minimum transverse dimension of the discharge passage.

10. A fluid control device comprising an elongated one piece hollow housing having an internal partition dividing the housing interior into axially spaced pressure and exhaust chambers, the pressure chamber being of greater axial length than transverse dimension, the partition being formed with an axial passage connecting the chambers, a circular valve seat terminating in said exhaust chamber at one end of said passage, a valve body, resilient means biasing the valve body against the valve seat, the housing being formed with a plurality of integral bosses for attaching conduits to the housing, each boss having a coaxial through passage communicating with the interior of the housing, said bosses including a number projecting laterally from the housing with their axes disposed in three different parallel planes normal to the longitudinal axis of the housing, the through passage in a first one of said number of bosses communicating with the exhaust chamber to discharge fluid released into the latter through the partition passage, said first boss having its axis in a first one of said three planes, the through passage in a second of said number of bosses opening into the pressure chamber and having its axis in a second one of said three planes, the through passages in a third and a fourth of said number of bosses opening into the pressure chamber and having their axes in a third plane axially spaced from and parallel to said first and second planes, the axis of each boss in any of said three planes projecting in a direction that is different from and is oriented at substantially 90° to the direction of projection of at least two others of said plurality of integral bosses, the distance between the first and the second of said three planes being no greater than twice the diameter of the largest passage through any of said bosses having its axis in any of said three planes, and the distance between the second and the third of said three planes being no greater than said diameter.

11. A fluid control device as defined in claim 10 in which said second of said number of bosses is internally threaded and its through passage is of larger cross sectional area throughout its extent than any one of the other through passages for facile attachment of the housing directly to an externally threaded supply conduit, the last mentioned boss being the sole projection on that side of the housing on which it is located to permit mounting of the device on such a conduit projecting from a wall in normal relation and with the housing in close juxtaposition to such a wall.

12. A fluid control device as defined in claim 10 in which the axis of one of said third and fourth bosses is parallel to the axis of said first boss.

13. A fluid control device as defined in claim 11 in which the axes of three of said bosses have a common point of intersection spaced from the plane containing the axis of the internally threaded boss.

14. A fluid control device as defined in claim 10 in which two of the bosses have their axes in one of said three planes and the axis of one of such two bosses is parallel to the axis of said boss containing the passage through which fluid is discharged.

References Cited in the file of this patent

UNITED STATES PATENTS

| | | |
|---|---|---|
| 1,538,394 | Freeberg | May 19, 1925 |
| 1,687,209 | Holmes | Oct. 9, 1928 |
| 1,774,805 | Maynard | Sept. 2, 1930 |
| 2,040,776 | Marvin | May 12, 1936 |
| 2,194,541 | Buttner | Mar. 26, 1940 |
| 2,210,555 | Podolsky | Aug. 6, 1940 |
| 2,590,656 | Schnebel | Mar. 25, 1952 |
| 2,652,069 | Goheen | Sept. 15, 1953 |
| 2,666,448 | Garretson et al. | Jan. 19, 1954 |